United States Patent
van Halteren

(10) Patent No.: US 8,331,595 B2
(45) Date of Patent: Dec. 11, 2012

(54) HEARING INSTRUMENT WITH IMPROVED VENTING AND MINIATURE LOUDSPEAKER THEREFORE

(75) Inventor: Aart Zeger van Halteren, Hobrede (NL)

(73) Assignee: Sonion Nederland BV, Amsterdam (NL)

( * ) Notice: Subject to any disclaimer, the term of this patent is extended or adjusted under 35 U.S.C. 154(b) by 356 days.

(21) Appl. No.: 12/483,028

(22) Filed: Jun. 11, 2009

(65) Prior Publication Data

US 2009/0310807 A1    Dec. 17, 2009

Related U.S. Application Data

(60) Provisional application No. 61/131,659, filed on Jun. 11, 2008.

(51) Int. Cl.
*H04R 25/00* (2006.01)
(52) U.S. Cl. .................. 381/328; 381/322; 381/380
(58) Field of Classification Search .............. 381/322, 381/328, 380
See application file for complete search history.

(56) References Cited

U.S. PATENT DOCUMENTS

| | | | |
|---|---|---|---|
| 6,327,370 B1 * | 12/2001 | Killion et al. | 381/313 |
| 6,744,897 B1 * | 6/2004 | Vonlanthen | 381/322 |
| 6,920,227 B2 | 7/2005 | Chalupper et al. | |
| 7,106,878 B2 * | 9/2006 | Saiki et al. | 381/396 |
| 7,263,195 B2 * | 8/2007 | Harvey et al. | 381/328 |
| 7,711,131 B2 * | 5/2010 | Furuya | 381/182 |
| 7,983,433 B2 * | 7/2011 | Nemirovski | 381/318 |
| 2008/0205691 A1 | 8/2008 | Beekman et al. | |
| 2008/0226115 A1 | 9/2008 | Beekman et al. | |

FOREIGN PATENT DOCUMENTS

| | | |
|---|---|---|
| EP | 0377074 A2 | 7/1990 |
| EP | 1 871 141 | 12/2007 |
| EP | 1933589 A1 | 6/2008 |
| GB | 2 018 089 | 10/1979 |
| WO | 2007/018657 | 2/2007 |

OTHER PUBLICATIONS

Scheller, Tom et al., "Open fitting of DSP instruments is not as simple as it may seem"; The Hearing Journal, Jan. 2006, vol. 59, No. 1, pp. 34-41.
European Search Report and Opinion for Application No. EP 09 162 476.7, mailed Jun. 5, 2012, 6 pages.

* cited by examiner

*Primary Examiner* — Curtis Kuntz
*Assistant Examiner* — Jasmine Pritchard
(74) *Attorney, Agent, or Firm* — Nixon Peabody LLP

(57) ABSTRACT

The present invention relates to improvements in acoustical venting of hearing aid earmolds and to miniature loudspeakers with housing structures configured to support improved hearing aid venting. The miniature loudspeaker comprises a front chamber with first and second separate sound ports so as to allow the front chamber to form an integral part of the acoustical vent of the hearing aid earmold. Thus, while using the same opening in the hearing aid for both sound output and venting, sound from the outside of the hearing aid may be introduced into the users ear via the same opening.

20 Claims, 4 Drawing Sheets

HEARING INSTRUMENT WITH IMPROVED VENTING AND MINIATURE LOUDSPEAKER THEREFORE

RELATED APPLICATION DATA

This application is a nonprovisional application of U.S. Provisional Application No. 61/131,659, filed Jun. 11, 2008, which is incorporated herein by reference.

FIELD OF INVENTION

The present invention relates to improvements in acoustical venting of hearing aid earmolds and to miniature loudspeakers with housing structures configured to support improved hearing aid venting.

BACKGROUND OF THE INVENTION

It is well-known in the art to include an acoustical vent in an earmold of a hearing aid or instrument. The acoustical vent is a sound duct or channel extending from a sound port in a tip portion of a hearing aid earmold to another sound port positioned in an end surface of the earmold so as to allow sound propagation between the otherwise occluded ear canal (when the hearing aid is mounted firmly in the ear) and the surroundings. A discussion of function, advantages and drawbacks of acoustical venting in hearing instruments can for example be found on pp. 34-41 of the January 2006 issue of The Hearing Journal "Open fitting of DSP instruments is not as simple as it may seem".

A significant drawback of prior art vented hearing aid earmolds has been the occupation of shell or earmold surface area near the tip portion of the shell by two separate sound ports. A speaker sound port is coupled to the miniature hearing aid loudspeaker via a sound tube and a separate sound port for the acoustical vent as described above. This may be seen in e.g. EP1933589 and U.S. Pat. No. 6,920,227.

The tip portion of the earmold is particularly problematic in this context because of severe size constraints dictated by the requirement of fitting deeply into a user's ear canal at a position proximate to the eardrum. While the size constraints to a certain extent depend on a style of the particular hearing aid or instrument in question, such as In-the-Ear (ITE), In-the-Canal (ITC), Completely-in-Canal (CIC) or Receiver-In-Canal (RIC), it remains generally favourable to minimize occupation of shell area by the sound ports. Savings in shell area can be allocated to alternative improvements in the hearing aid design, for example, increasing the size of the miniature loudspeaker or including a cerumen barrier or an occlusion sensor etc.

The drawback has been overcome by the provision of a hearing aid earmold that comprises an acoustical duct or vent shaped and sized to transmit sound between a distant tip portion and a proximal end portion of the earmold and wherein the acoustical vent extends through a front chamber of a miniature loudspeaker or speaker of the hearing aid. This means that the acoustical vent and the speaker outlet sound channel are combined into a single common sound channel or duct needing only a single sound output port at the tip portion of the hearing aid earmold.

A hearing aid having a set-up resembling this may be seen in EP0377074 which, however, has a normal vent but has a wider channel used for flushing the front chamber of the receiver as well as the sound output from the receiver to the sound output of the hearing aid. Under normal operation, the flushing channel is plugged and a normal sound blocking vent is used.

SUMMARY OF THE INVENTION

In a first aspect, the invention relates to a method of operating a hearing aid comprising a hearing aid housing having a first surface adapted to be positioned in or at an ear canal of a person and an at least substantially opposed surface adapted to face the surroundings of the persons ear. The hearing aid comprises a microphone positioned so as to detect sound from the surroundings, a single first sound opening in the first surface, a second sound opening in the opposed surface, and a miniature loudspeaker comprising a speaker housing.

The speaker housing includes a first motor assembly, a first displaceable diaphragm operatively coupled to the first motor assembly, a first sound port, and a second sound port. The first displaceable diaphragm comprises first and second opposing diaphragm surfaces arranged to divide the speaker housing into a front chamber above the first diaphragm surface and a first back chamber above the second diaphragm surface. The first sound port is arranged in a first portion of the speaker housing and is acoustically coupled to the front chamber to transmit or receive sound to/from outside of the speaker housing. The second sound port is arranged in a second portion of the speaker housing and is acoustically coupled to the front chamber to transmit or receive sound to/from outside of the speaker housing.

The method comprises detecting, via the microphone, sound from the surroundings and outputting a signal, feeding a first signal relating to the signal to the motor assembly so as to produce a corresponding sound, transporting the produced sound from the first sound port to the first sound opening, and allowing sound from the second sound opening to exit the first sound opening via the front chamber.

In the present context, a "sound port/opening" designates an unrestricted aperture through a wall or surface structure or an aperture covered by a substantially acoustically transparent (in at least a portion of the audible range) membrane or grid that may block entry of dust particles, cerumen or other contaminants.

In the present context, structures that are "acoustically coupled" designate structures where the transmission of acoustical signals or sound is essentially unhindered in at least a portion of the audible range such as a frequency range between 300 Hz and 3 kHz, and more preferably from 100 Hz to 10 kHz.

A motor assembly transforms electrical energy to mechanical vibration and may be based on anyone of a number of different electro-mechanical drive or actuation technologies such as moving armature, moving coil or piezoelectric principles.

In the present context, a "miniature loudspeaker" designates a loudspeaker wherein the housing occupies a volume less than 1170 mm$^3$. According to a preferred embodiment of the invention based on a pair of symmetrically mounted moving armature motor assemblies, the miniature speaker housing has dimensions of less than about 3.0×6.0 mm×3.5 mm (w×l×h).

The area of each of the first and second sound ports/openings is preferably larger than 0.75 mm$^2$ and smaller than 7.5 mm$^2$. The first and second sound ports/openings and front chamber are preferably dimensioned so as to exhibit a sufficiently low acoustic impedance to allow an acoustical vent of a hearing aid to extend through these components without materially affecting the acoustical impedance of the acoustical vent.

The first and second sound ports are preferably arranged in substantially opposing wall portions of the speaker housing. The speaker housing may have a substantially rectangular or cylindrical shape with a central longitudinal plane. These shapes are often advantageous in allowing the speaker housing to be installed in the tip portion of the hearing aid earmold in a space-efficient manner. The first and second sound ports may be arranged in the central longitudinal plane since this arrangement facilitates coupling of the first sound port to a distant shell sound port of an associated hearing aid earmold.

Naturally, the microphone may be positioned so as to detect sound entering the second sound opening or may be positioned at another position in or at the opposed surface. As this surface is adapted to point away from the ear canal of the person, space requirements may be more relaxed and there may be room for both the second sound opening and an opening to a microphone.

Typically, the first surface is adapted to be positioned in the ear canal, either deeply therein or at the entrance thereof. The opposed surface, however, may be positioned within the ear canal or in the outer ear of the person. Thus, this surface may be much larger, facilitating a much more relaxed positioning of the individual elements.

Any desired means may be used for transporting the sound generated in the loudspeaker to the first sound opening, such as a flexible tube.

By allowing sound from the second sound opening to exit the first sound opening, the so-called occlusion effect may be avoided or reduced. Due to e.g. space requirements, this sound is output via the same opening delivering the sound from the loudspeaker.

According to the invention, this sound is transported from the surroundings to the ear canal or the opening via the front chamber of the loudspeaker. Thus, this loudspeaker forms part of the sound passage from the surroundings to the ear canal.

Naturally, this sound transport or passage preferably is via the first and second sound ports.

The first signal relates to the signal output of the microphone but may be adapted in any of a number of manners, such as filtering and amplification. A filtering may be performed in order to adapt the sound to be output to the particular hearing problems of the user, but a filtering may also be performed to adapt the sound generated to be combined with that received from the surroundings and exiting the first sound opening. Thus, any altering or filtering of the sound when being transported from the surroundings via the loudspeaker and to the first sound opening may be counteracted, if desired.

According to a preferred embodiment of the invention, the miniature loudspeaker furthermore comprises a second motor assembly and a second displaceable diaphragm operatively coupled to the second motor assembly. The second displaceable diaphragm comprises first and second opposing diaphragm surfaces with the first diaphragm surface acoustically coupled to the front chamber and the second diaphragm surface of the second displaceable diaphragm acoustically coupled to a second back chamber arranged above the second diaphragm surface. According to this embodiment, there is provided a dual-diaphragm and motor miniature loudspeaker that includes a common front chamber to simplify internal construction of the miniature loudspeaker and make efficient use of inner volume of the miniature speaker. Then, the feeding step may comprise feeding a signal also to the second motor assembly so as to produce a second sound, and wherein the transporting step comprises transporting the second sound to the first sound opening.

According to one variant of this embodiment of the invention, the first motor assembly and displaceable diaphragm are mounted on a first side of the front chamber and the second motor assembly and displaceable diaphragm are mounted on a second, and opposing, side of the front chamber. The motor assemblies and the displaceable diaphragms are arranged substantially symmetrically around the central longitudinal plane to provide a miniature speaker of essentially symmetrical construction. The first and second sound ports are preferably arranged, in a plane parallel to the central longitudinal plane, in-between the first and second displaceable diaphragms.

The symmetrical construction of the miniature speaker is preferably implemented so that a moving mass of the first motor assembly and displaceable diaphragm is substantially equal to a moving mass of the second motor assembly and displaceable diaphragm. This fully symmetrical construction can provide a high degree of cancellation of mechanical vibration of the miniature loudspeaker during actuation. The cancellation of mechanical vibration makes it possible to attach or mount the miniature speaker directly (i.e. without a resilient suspension) to the earmold shell for a wide range of hearing aid applications. For other hearing aid applications, the mechanical vibration cancellation will at least relax vibration isolation requirements for any speaker suspension member. This is especially so when the signals fed to the first and second motor assemblies are the same.

According to yet another embodiment of the invention, the first and second motor assemblies are adapted to output different frequency ranges. This may be obtained in multiple manners, such as when (i) the feeding step comprises feeding to the first motor assembly a signal having a frequency up to a first high-frequency cut-off point, (ii) the feeding step comprises feeding to the second motor assembly a signal having a frequency up to a second high-frequency cut-off point, and (iii) wherein second high-frequency cut-off point is substantially greater than the first high-frequency cut-off point such as between 1 kHz and 5 kHz greater.

Alternatively, the miniature speaker may be deliberately made with asymmetrical construction. The asymmetrical construction is advantageously exploited by letting the first motor assembly and displaceable diaphragm function as low-frequency driver (woofer) and the second motor assembly and displaceable diaphragm function as high-frequency driver (tweeter). The low-frequency driver may have a diaphragm area and moving mass that are significantly larger than the corresponding values for the high-frequency driver. In this situation, the same signal may be fed to both motor assemblies while having output sound of different characteristics. This adaptation optimizes the sound pressure generating capability of the low-frequency (woofer) driver in a low-frequency range such as below 1000 Hz or below 500 Hz. Additionally, the sound pressure output capability of the miniature speaker throughout a high-frequency range such as above 3 kHz or above 5 kHz is improved. The low-frequency driver may be operative to produce sound up to a first high-frequency cut-off point such as 2 kHz, 3 kHz or 4 kHz and the high-frequency driver may be operative to produce sound up to a second high-frequency cut-off point such as 5 kHz, 6 kHz or 8 kHz. A high-frequency cut-off point is defined as a frequency where a magnitude of the frequency response is 10 dB below the 1 kHz magnitude as measured with the relevant driver mounted in the loudspeaker housing.

The second high-frequency cut-off point is preferably substantially greater than the first high-frequency cut-off point such as between 1 kHz and 5 kHz greater.

According to one embodiment of the invention, the miniature loudspeaker comprises a first intermediate sound chamber acoustically coupled between the first surface of the first displaceable diaphragm and the front chamber through a third sound port and a second intermediate sound chamber acoustically coupled between the first surface of the second displaceable diaphragm and the front chamber through a fourth sound port. An intermediate sound chamber(s) is optional for many applications, but may for example comprise front chamber(s) of an already existing sound driver. Accordingly, it is possible to integrate one or more of such existing sound driver(s) in the present miniature loudspeaker in a convenient manner requiring only minimal adaptations to the design of the existing sound driver.

According to a particularly advantageous embodiment of the invention, the front chamber and the first and second sound ports are all formed in a single integrally fabricated plastic element, for example, by injection moulding or SLA (Stereo lithography Apparatus) fabrication.

Naturally, the method may be used in relation to a hearing aid earmold comprising a shell with an outer contour shaped to fit a hearing aid user's ear canal. A miniature speaker according to any of the above-described embodiments of the invention is positioned inside the shell. The shell comprises a distant tip portion with a first shell sound port and a proximal end portion with a second shell sound port. The first, or front, sound port of the miniature speaker is acoustically coupled to the first shell sound port and the second, or rear, sound port of the miniature speaker is acoustically coupled to the second shell sound port. The first shell sound port accordingly functions a sound outlet of the hearing aid for broadcasting amplified and processed sound toward the hearing aid user's ear canal. In accordance with the invention, the first shell sound port additionally serves as a sound entrance point for reverse transmission of sound in the user's at least partly occluded ear canal which sound is transmitted through the earmold, for example, by an acoustical duct or vent terminating at the second shell sound port. The acoustical vent may have a circular, semi-circular or polygonal cross-sectional profile and a cross-sectional area between 0.75 and 7.0 mm². The length of the acoustical vent can vary considerably and is largely determined by the specific dimensions of the hearing aid earmold.

The acoustical coupling between the first shell sound port and the first sound port of the miniature speaker and/or between the second shell sound port and the second sound port may be provided by resilient sound tube(s) or acoustical duct(s)/vent(s) formed in earmold material.

The hearing aid earmold may comprise a standardized or a customized shell enclosing a hearing aid selected from the group of {In-the-Ear, In-the-Canal, Completely-in-Canal, Receiver-In-Canal}. The customized shell is fabricated from an ear canal impression of the hearing aid user and this impression may be provided in either virtual form, such as a digital computer representation, or in tangible form such as a physical impression.

In one embodiment of the invention, the earmold shell and the miniature loudspeaker comprise mating first and second electrically conducting contact pairs adapted to provide solderless/solderfree electrical interconnection between the miniature loudspeaker and electronic assembly of the hearing aid. One pair of the first and second electrically conducting contact pairs may, for example, comprise an electrically conducting spring such as a helical, torsion, or leaf spring. This embodiment is particularly advantageous in combination with the above-mentioned fully symmetrical dual-diaphragm miniature loudspeaker because of a significantly reduced level of mechanical vibration of the loudspeaker compared to single diaphragm miniature speakers.

Also, the method of the invention may be used in relation to a hearing aid comprising an earmold shell with an outer contour shaped to fit a hearing aid user's ear canal. A miniature speaker according to any of the above-described embodiments of the invention is positioned inside the earmold shell. The earmold shell furthermore comprises an acoustical duct or vent adapted to transmit sound between a distant tip portion and proximal end portion of the earmold shell. The acoustical duct or vent extends through the front chamber of the miniature speaker. Accordingly, the loudspeaker front chamber is integrated into the acoustical vent of the earmold with propagation of sound through the first and second loudspeaker sound ports. Inside the acoustical vent, sound generated by the miniature loudspeaker is transmitted in a forward direction (towards the user's ear canal) and sound inside the user's (occluded) ear canal is transmitted in a reverse direction (toward the second shell sound port of the earmold).

The hearing aid is preferably selected from the group of In-the-Ear, In-the-Canal, Completely-in-Canal, and Receiver-In-Canal hearing instruments.

These and other aspects of the present invention will become more apparent from the following detailed description of the preferred embodiments of the present invention when viewed in conjunction with the accompanying drawings.

BRIEF DESCRIPTION OF THE DRAWINGS

In the following, the invention will be described with reference to the following drawings.

DESCRIPTION OF THE ILLUSTRATED EMBODIMENTS

Figure 1:
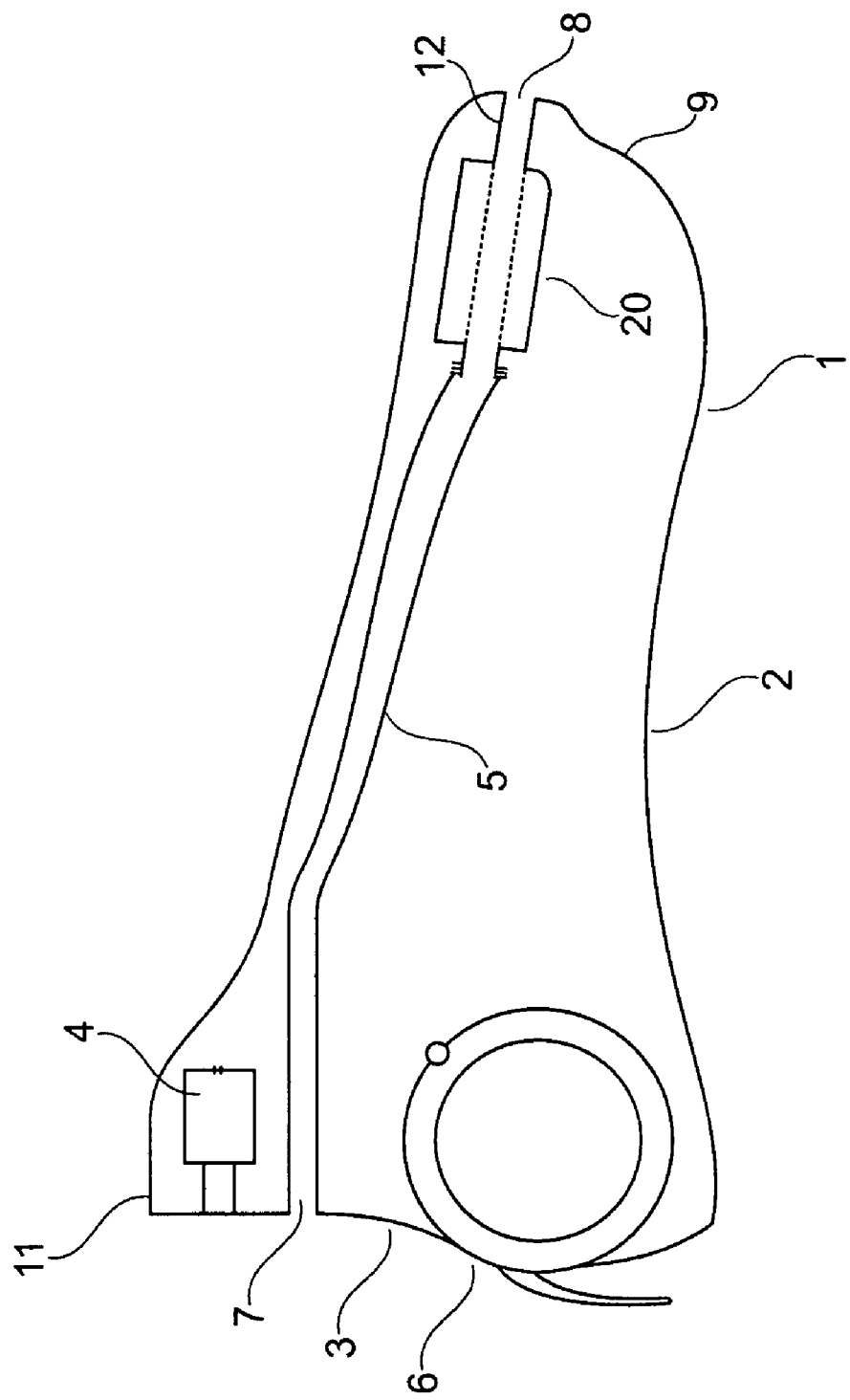
FIG. 1 shows a cross-sectional view of an ITC hearing aid with a vent channel according to the invention.

FIG. 1 is a schematic illustration of an ITC hearing aid earmold 1. The earmold 1 encloses various electronic, mechanical and electroacoustic components and functions to shield these from an external environment.

The earmold 1 comprises an at least partly hollow shell 2 having an outer contour shaped to fit a hearing aid user's ear canal. In the present embodiment of the invention, the earmold 1 includes a customized shell 2 that has been from an ear canal impression of the hearing aid user's ear canal. The ear canal impression may be provided in either virtual form, such as a digital computer representation, or in tangible form such as a physical impression. In other embodiments of invention, the shell 2 is supplied with a prefabricated outer contour, preferably including elastomeric or deformable shell portions that can fit into a plurality of ear canal shapes and sizes.

The earmold 1 comprises a miniature dual-diaphragm speaker 20 with a through-going canal or vent. The construction or design of the miniature dual-diaphragm speaker 20 is described in detail in connection with FIGS. 2-4. The earmold 1 comprises a battery compartment 6 and a miniature microphone 4 and a signal amplification and processing assembly (not shown) operatively coupled to the miniature microphone 4 and the miniature dual-diaphragm speaker 20. The shell 2 comprises a distant tip portion 9 with a first shell sound port 8 and a proximal end portion 11 with a second shell sound port 7. The first shell sound port 8 functions as a sound outlet operative to transmit sound generated by the miniature dual-diaphragm speaker 20 towards the hearing aid user's ear canal and ear drum during normal operation. The second shell sound port 7 or vent port is placed in faceplate portion 3 of the shell 2 and serves to acoustically seal the interior of the shell 2 towards the external environment. The faceplate portion 3 also supports the battery chamber 6, the miniature microphone 4 and, possibly, one or more user actuable control knobs (not shown).

The vent port 7 is acoustically coupled to a rear sound port of the miniature dual-diaphragm speaker 20 through an acoustical duct or vent channel 5 positioned inside the shell 2. A frontal sound port of the miniature dual-diaphragm speaker 20 is acoustically coupled to the sound outlet 8 for example by a sound outlet channel or duct 12 such as an acoustically sealed and resilient or stiff sound tube. The miniature dual-diaphragm speaker 20 comprises a front chamber (e.g., the front chamber 23 on FIG. 2a) that is acoustically coupled to both the frontal and rear sound ports and therefore allows the acoustical vent 5 to extend through the front chamber and further through the front sound canal 12. Accordingly, a direct passage for sound, and possibly for air flow, is provided between the vent port 7 in the faceplate portion 3 and the sound outlet 8 in the tip 9.

The vent channel 5 can be formed and shaped in various ways depending on the technology utilized to create the earmold shell 2. In one embodiment, the vent channel 5 is formed in earmold material and manufactured as an integral part of the shell 2. In other embodiments of the invention, the vent channel 5 comprises an elastomeric and preferably resilient sound tube to allow the vent channel to be fitted with the customized shell 2 in a flexible manner. The sound outlet channel or canal 12 may comprise an elastomeric material and function as a resilient suspension for the miniature dual-diaphragm speaker 20 to isolate, or at least attenuate, mechanical vibration generated by the latter components from the earmold 2.

According to another, and highly advantageous, embodiment of the invention, the miniature dual-diaphragm speaker 20 is directly attached to the earmold 2, i.e. without any intermediate resilient suspension, to simplify assembly of the ITC hearing aid and save space in the distant tip portion 9 of the shell 2. This direct earmold attachment is possible due to a significantly reduced amount of mechanical vibration of the present miniature dual-diaphragm speaker 20. The substantially symmetrical design of the miniature dual-diaphragm speaker 20 with two opposing motor and diaphragm assemblies moving in opposite direction during operation (refer to FIG. 2a) leads to a significant reduction of mechanical vibration compared to a single motor/diaphragm speaker with similar acoustical performance.

Figure 2A:
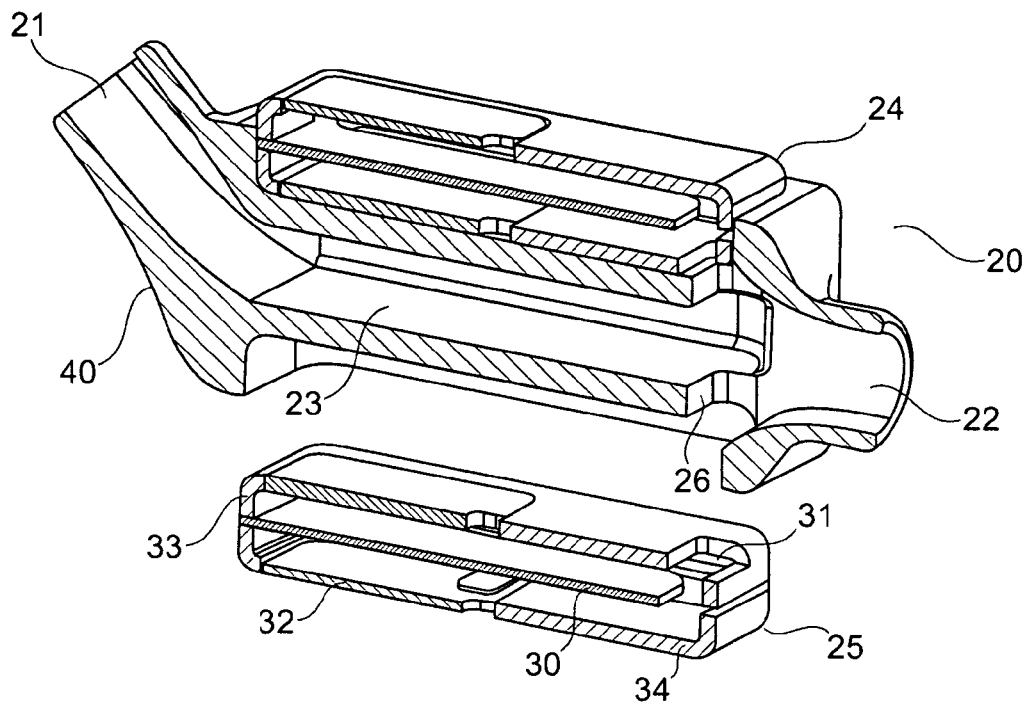
FIGS. 2a-2b are cross-sectional views of a miniature dual-diaphragm speaker according the invention.
Figure 2B:
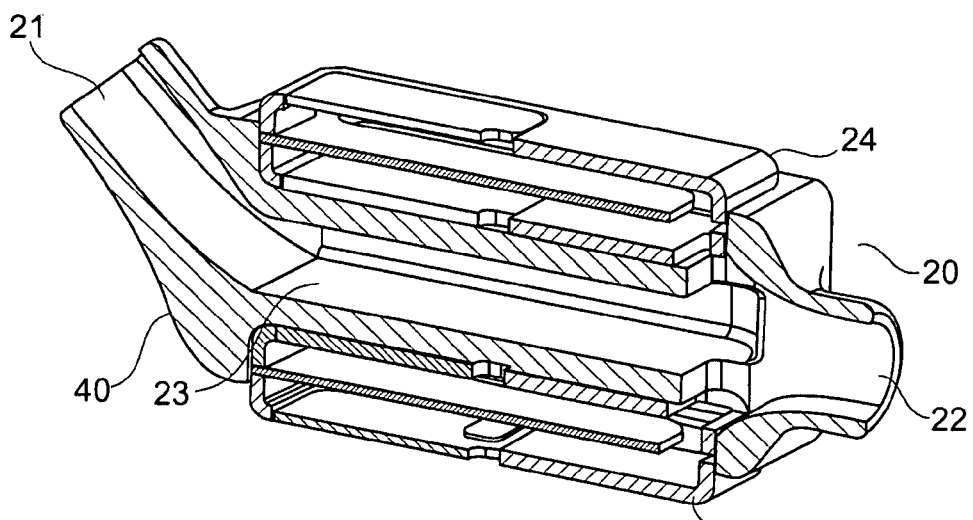

FIG. 2a is cross-sectional view of a miniature dual-diaphragm speaker 1 in a partially disassembled state. The miniature dual-diaphragm speaker 20 or miniature speaker comprises first and second sound drivers 24, 25, respectively, which are substantially identical and based on moving armature technology.

Internal features of the first and second sound drivers 24, 25 are illustrated in simplified form. A detailed description of the internal design of the second (and first) sound driver 25 is described in detail in co-pending US Publication No. 2008-0205691 and US Publication No. 2008-0226115, which are herein incorporated by reference in their entireties. The disclosed sound driver design is particularly well-adapted for use in the present invention due to its small size and a form factor with small height. However, other types of sound drivers based on moving armature receivers/speakers and/or moving coil speakers may readily be used in the present invention depending on size, acoustic performance or other constraints dictated by any particular application.

The miniature speaker 20 furthermore comprises an integrally formed front-chamber and sound port component 40 or front-chamber component. The first and second sound drivers 24,25 are symmetrically mounted about a central longitudinal plane extending through the centre of front-chamber component 40. The first and second sound drivers 24,25 are configured so that an external electrical drive signal to the miniature speaker 20 causes the respective diaphragm and motor structures to move in opposing directions. This opposing movement causes a substantial reduction of mechanical vibration of the miniature speaker 20 and a doubling of the sound pressure in the front chamber 23.

Due to the symmetrical layout of the miniature speaker 20 and essentially identical first and second sound drivers 24,25, the following detailed disclosure is limited to the second sound driver 25 and its coupling to the front-chamber component 40.

The second sound driver 25 comprises a metallic housing 34 partly formed in a ferromagnetic alloy and enclosing a motor assembly operatively coupled to a displaceable and polymeric diaphragm (not shown). The motor assembly comprises a drive coil (not shown) and a displaceable armature portion 30 extending through a tunnel in the drive coil so as to allow a magnetic AC field to vibrate the armature portion 30. The magnetic AC field may be induced by the application of drive current or voltage to the drive coil. The displaceable armature portion 30 is directly attached to the polymeric diaphragm so that armature vibration is transmitted to the polymeric diaphragm for the generation of sound. The second sound driver 25 furthermore comprises a first sound chamber 33 located above the polymeric diaphragm and a second sound chamber (back chamber) 32 located below. The first sound chamber 33 is operating as an intermediate sound chamber for the assembled miniature speaker 20 due to its placement and acoustical coupling. The first sound chamber 33 is acoustically connected or coupled to a front chamber 23 of the miniature speaker 20 through a driver sound aperture 31 placed in the upper portion of the metallic housing 34 of the second sound driver 25. The driver sound aperture 31 is acoustically coupled to, and aligned with, a correspondingly shaped sound inlet 26 in the front-chamber component 40 so as to transmit sound generated by vibration of the polymeric diaphragm into the front chamber 23. The driver sound aperture 31 and the first sound chamber 33 are dimensioned and shaped to transmit at least a significant portion of the audible range of sound, such as a range between 300 Hz and 3 kHz, more preferably between 100 Hz and 10 kHz, from the polymeric diaphragm 30 to the front chamber 23 without significant attenuation. In the present embodiment of the invention, the area of the driver sound aperture 31 is about 0.70 mm$^2$.

In other embodiments of the invention, the driver sound aperture 31 and the first sound chamber 33 are absent and a direct acoustical coupling between the polymeric diaphragm and the front chamber 23 established.

The front chamber 23 acts a common front chamber for both the first sound driver 24 and the second sound driver 25—superimposing their respective sound pressure contributions to generate a resulting sound pressure or signal. The front-chamber component 40 comprises a front sound port 22 and a rear sound port 21 which are both acoustically coupled to the front chamber 23 to transmit front chamber sound to the surroundings. The front and rear sound ports 22, 21 comprise respective sound spouts that may be useful for coupling the output of these ports to an acoustical vent formed in an associated hearing aid earmold as described above in connection with FIG. 1. The shape and size of these sound ports may of course vary depending on the coupling mechanism employed in the associated hearing instrument. Preferably, each of the front and rear sound ports 22, 21 has a cross-sectional area between 0.75 and 7.0 mm$^2$. In some applications, it has been useful to make the cross-sectional area of rear sound port smaller than the cross-sectional area of the front sound port for example between 10 and 75% smaller.

Figure 3:
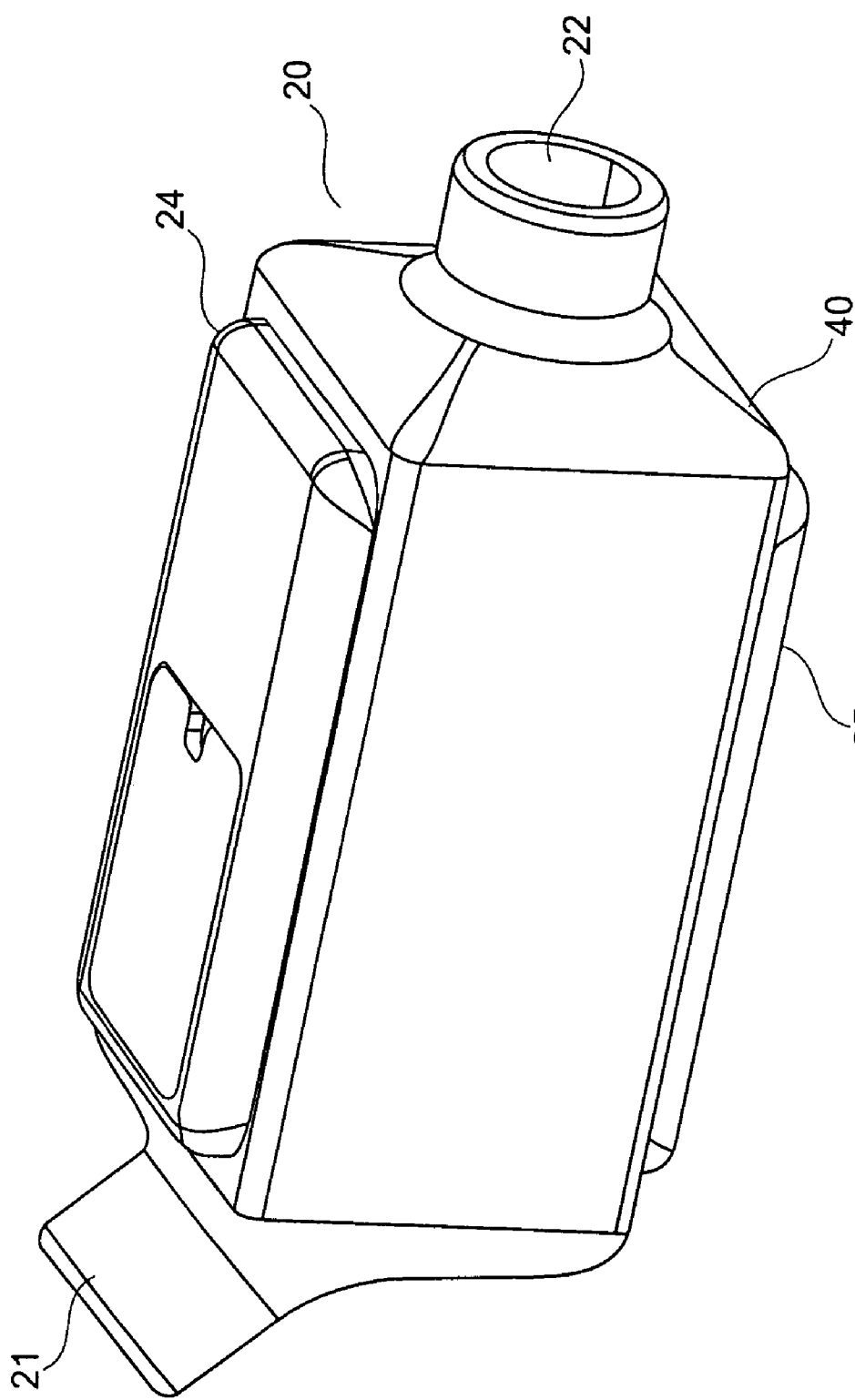
FIG. 3 shows the miniature dual-diaphragm speaker of FIGS. 2a-2b in an assembled state.

FIG. 3 is an illustration of the miniature speaker 20 in an assembled state. The respective housing portions of first and second sound drivers 24, 25 protrude slightly from the outer contour of the front-chamber component 40 in a direction transversal to the central horizontal plane of the miniature speaker 20. Outer dimensions of the housing portion (without sound spouts 22, 21) may be about or less than 3.0×6.0×3.5 mm (w×l×h).

Figure 4A:
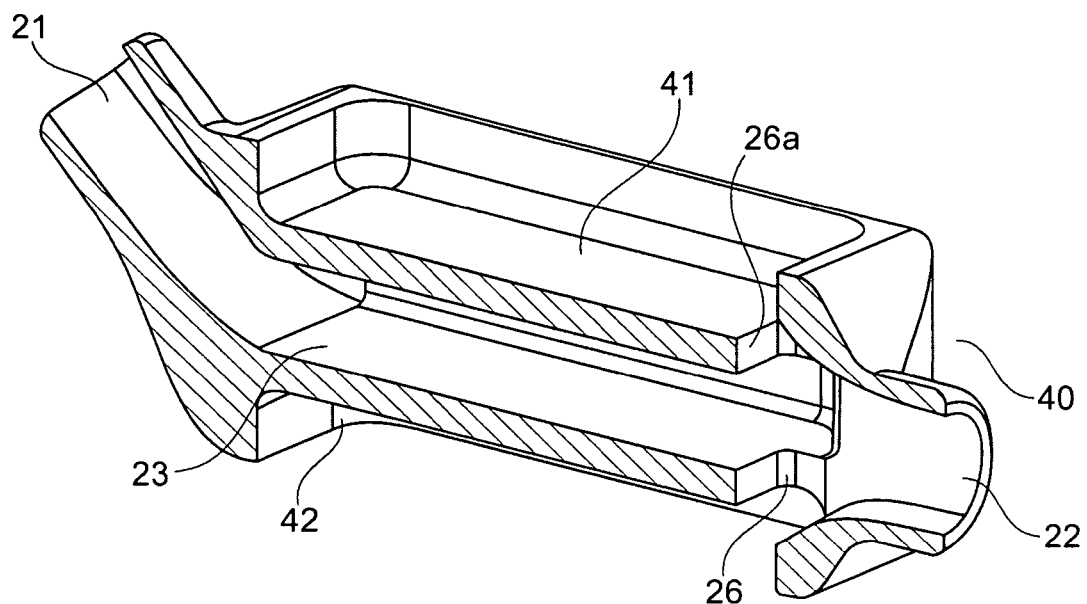
FIGS. 4a-4b illustrates an integral front-chamber and sound port component suitable for use in the miniature dual-diaphragm speaker of FIGS. 2a-2b.
Figure 4B:
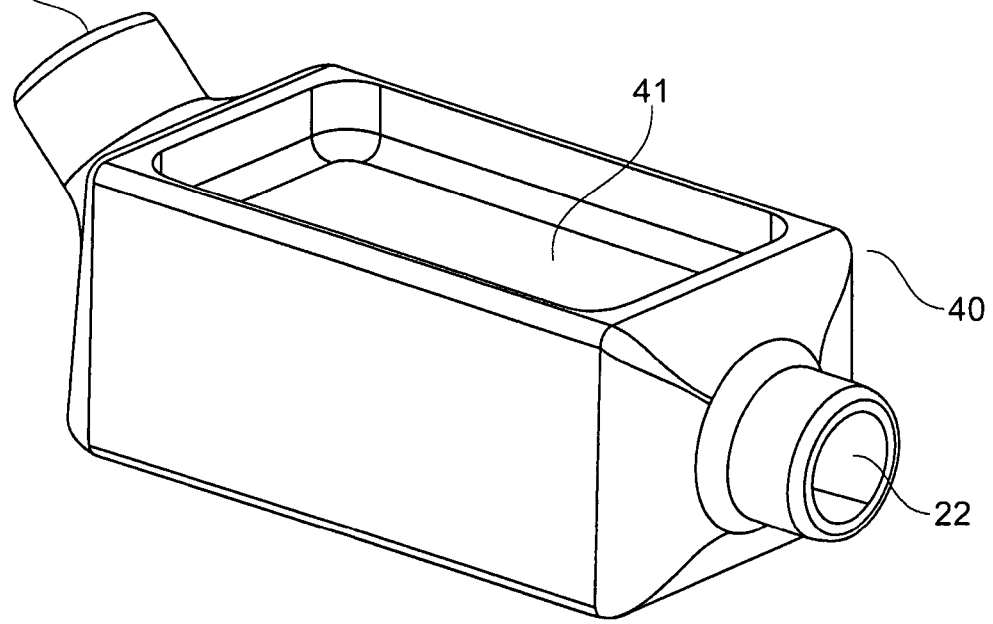

FIG. 4a is a cross-sectional view of the integrally formed front-chamber and sound port component 40 or front-chamber component. The front-chamber component 40 is preferably fabricated by injection moulding of polymeric materials or blends. In some embodiments of the invention, the front-chamber component 40 is fabricated by SLA (Stereo lithography Apparatus) technology. SLA is a rapid prototyping technology wherein a computer system receives data from a CAD model of the communication device shell contour and cures a liquid photopolymer resin with a laser beam to form a solid three-dimensional object.

Alternatively, front-chamber component 40 can be constructed from several separate polymeric or metallic items that are glued, welded or otherwise firmly attached to each other.

The front-chamber component 40 has a nearly symmetrical and rectangular shape around a central horizontal plane extending through the centre of the front sound port 22. The front and rear sound ports 22, 21 are mounted in opposing wall portions of the front-chamber component 40 and centred around its central longitudinal plane. The front and rear sound ports 22, 21 project from the otherwise largely rectangular body 40 in a slightly asymmetrical manner where the rear sound port 21 projects in an upwardly angled direction. In other embodiments of the invention, the front-chamber component 40 has an entirely symmetrical shape about said central plane. In yet other embodiments of the invention, the front and rear sound port 22, 21 are mounted horizontally off-set relative to the central horizontal plane.

The front-chamber component 40 comprises an upper or first substantially rectangular basin with a plane button surface 41. An upper sound inlet 26a is cut-out in the plane button surface 41 and mates to a driver sound aperture provided in the first sound driver. The opposite wall structure of the plane button surface 41 serves as an upper enclosure surface for the front sound chamber 23. A corresponding substantially rectangular basin structure is placed on the opposite side of the front chamber 23 with a plane button surface 42. The first and second basins have contours that mate tightly with the respective housing contours of the first and second sound drivers 24, 25 (refer to FIG. 2a). The first and second sound drivers 24, 25 may be fastened in/to the respective basins formed in front-chamber component 40 by a number of techniques such as gluing, welding or moulding to provide a firm attachment and acoustically sealed interconnection between the sound drivers 24, 25 and the front chamber 23.

The design of the front chamber 40 with opposing sound ports 22, 21 allows the front chamber 40 to provide a through-going sound propagation path in the miniature speaker 20. The front chamber 40 can accordingly be included in an acoustical vent of hearing aid earmold with the front sound port 22 operating as a sound outlet, for transmission of speaker generated sound towards the hearing aid user's ear canal, and as a sound inlet for reverse sound propagation for (low frequency) ear canal sound pressure. The ear canal (low frequency) sound pressure is transmitted through the front chamber 23 and rear port 21 of the miniature speaker 20, through the vent channel 5 and out of the vent port 7 toward the surroundings.

While various embodiments in accordance with the present invention have been shown and described, it is understood that the invention is not limited thereto. While the present invention is initially claimed relative to a method, corresponding apparatus claims are envisioned. Further, the present invention may be changed, modified and further applied by those skilled in the art. Therefore, this invention is not limited to the detail shown and described previously, but also includes all such changes and modifications.

The invention claimed is:

1. A method of operating a hearing aid comprising a hearing aid housing having a first surface adapted to be positioned in or at an ear canal of a person and an at least substantially opposed surface adapted to face the surroundings of the person's ear and having therein:
   a microphone positioned so as to detect sound from the surroundings,
   a single, first sound opening in the first surface,
   a second sound opening in the opposed surface, and
   a miniature loudspeaker comprising a speaker housing comprising therein:
      a first motor assembly and a first displaceable diaphragm operatively coupled to the first motor assembly, the first displaceable diaphragm comprising first and second opposing diaphragm surfaces arranged to divide the speaker housing into a front chamber above the first diaphragm surface and a first back chamber above the second diaphragm surface,
      a first sound port arranged in a first portion of the speaker housing and acoustically coupled to the front chamber to transmit or receive sound to/from outside of the speaker housing, and
      a second sound port arranged in a second portion of the speaker housing and acoustically coupled to the front chamber to transmit or receive sound to/from outside of the speaker housing;
      wherein the first and second sound ports are positioned in opposing wall parts of the speaker housing;
   the method comprising:
      detecting, via the microphone, sound from the surroundings and outputting a signal;
      feeding a first signal relating to the signal to the motor assembly so as to produce a corresponding sound;
      transporting the produced sound from the first sound port to the first sound opening; and
      allowing sound from the second sound opening to exit the first sound opening via the front chamber.

2. A method according to claim 1, wherein the hearing aid further comprises, within the housing:

a second motor assembly and a second displaceable diaphragm operatively coupled to the second motor assembly, the second displaceable diaphragm comprising first and second opposing diaphragm surfaces with the first diaphragm surface acoustically coupled to the front chamber, and the second diaphragm surface of the second displaceable diaphragm acoustically coupled to a second back chamber arranged above the second diaphragm surface, and wherein the feeding step comprises feeding a signal also to the second motor assembly so as to produce a second sound, and wherein the transporting step comprises transporting the second sound to the first sound opening.

3. A method according to claim 2, wherein the first motor assembly and displaceable diaphragm are mounted on a first side of the front chamber, and the second motor assembly and displaceable diaphragm are mounted on a second, and opposing side of the front chamber.

4. A method according to claim 2, wherein the feeding step comprises feeding to the first motor assembly a signal having a frequency up to a first high-frequency cut-off point, the feeding step comprises feeding to the second motor assembly a signal having a frequency up to a second high-frequency cut-off point; and wherein the second high-frequency cut-off point is substantially greater than the first high-frequency cut-off point.

5. A method according to claim 4, wherein the second high-frequency cut-off point is greater than the first high-frequency cut-off point by an amount between 1 kHz and 5 kHz.

6. The method according to claim 2, wherein the hearing aid further comprises:

a first intermediate sound chamber acoustically coupled between the first surface of the first displaceable diaphragm and the front chamber through a third sound port; and a second intermediate sound chamber acoustically coupled between the first surface of the second displaceable diaphragm and the front chamber through a fourth sound port.

7. A hearing aid comprising:

a hearing aid housing having a first surface configured to be positioned in or at an ear canal and a second surface substantially opposed to the first surface a microphone positioned to detect ambient sound;

a single first sound opening in the first surface;

a second sound opening in the second surface; and a miniature loudspeaker including:
  a speaker housing mounted within the hearing aid housing,
  a first displaceable diaphragm situated within the speaker housing and arranged to divide the speaker housing into a front chamber and a first back chamber,
  a first motor assembly situated within the speaker housing and operatively coupled to the first displaceable diaphragm to generate a first sound according to signals from the microphone, the first sound corresponding to the detected ambient sound,
  a first sound port situated in the speaker housing and configured to acoustically couple the front chamber and the first sound opening, and
  a second sound port situated in the speaker housing and configured to acoustically couple the front chamber and the second sound opening; and
  wherein sound entering the second sound opening is allowed to exit the first sound opening via the front chamber.

8. The hearing aid according to claim 7, wherein the hearing aid is further configured to transport the generated first sound out of the first sound opening via the first sound port in the speaker housing.

9. The hearing aid according to claim 7, wherein the miniature loudspeaker further comprises:

a second displaceable diaphragm situated within the speaker housing and arranged to divide the front chamber from a second back chamber in the speaker housing, and a second motor assembly situated within the speaker housing and operatively coupled to the second displaceable diaphragm to generate a second sound according to signals from the microphone, the second sound corresponding to the detected ambient sound.

10. The hearing aid according to claim 9, wherein the signals from the microphone that are received by first motor assembly are signals indicative of the detected ambient sound having a frequency up to a first high-frequency cut-off point, and wherein the signals from the microphone that are received by second motor assembly are signals indicative of the detected ambient sound having a frequency up to a second high-frequency cut-off point, and wherein the second high-frequency cut-off point is substantially greater than the first high-frequency cut-off point.

11. The hearing aid according to claim 10, wherein the microphone is configured to supply the signals such that the second high-frequency cut-off point is greater than the first high-frequency cut-off point by an amount between 1 kHz and 5 kHz.

12. The hearing aid according to claim 9, wherein the first and second displaceable diaphragms are opposing internal boundaries of the front chamber.

13. The hearing aid according to claim 9, wherein the first displaceable diaphragm and first motor assembly are mounted on a first side of the front chamber, and wherein the second displaceable diaphragm and second motor assembly are mounted on a second side of the front chamber that opposes the first side.

14. The hearing aid according to claim 7, wherein the first surface of the housing includes a tip that extends within the ear canal, and wherein the first sound opening is located proximate the tip so as to be located near an ear drum within the ear canal.

15. The hearing aid according to claim 7, further comprising one or more acoustic tubes comprising an acoustical vent to acoustically couple the second sound opening to the first sound opening via the front chamber of the miniature loudspeaker.

16. The hearing aid according to claim 7, further comprising:

a first intermediate sound chamber acoustically coupled between the first displaceable diaphragm and the front chamber through a third sound port; and a second intermediate sound chamber acoustically coupled between the second displaceable diaphragm and the front chamber through a fourth sound port.

17. The hearing aid according to claim 7, wherein the first sound port of the miniature loudspeaker housing is acoustically coupled to the first sound opening in the first surface via a first acoustical duct, and the second sound port of the miniature loudspeaker housing is acoustically coupled to the second sound opening in the second surface via a second acoustical duct, wherein the first and second acoustical ducts are configured such that acoustical signals in at least a portion of the audible range are transmitted through the first and second acoustical ducts substantially unhindered, and wherein the portion of the audible range includes acoustical signals with frequencies between approximately 300 Hz and approximately 3000 Hz.

18. The hearing aid according to claim 7, wherein the first sound port of the miniature loudspeaker housing is acoustically coupled to the first sound opening in the first surface via a first acoustical duct, and the second sound port of the miniature loudspeaker housing is acoustically coupled to the second sound opening in the second surface via a second acoustical duct, wherein the first and second acoustical ducts are configured such that acoustical signals in at least a portion of the audible range are transmitted through the first and second acoustical ducts substantially unhindered, and wherein the portion of the audible range includes acoustical signals with frequencies between approximately 100 Hz and approximately 10000 Hz.

19. The method according to claim 1, wherein the first sound port of the miniature loudspeaker housing is acoustically coupled to the first sound opening in the first surface via a first acoustical duct, and the second sound port of the miniature loudspeaker housing is acoustically coupled to the second sound opening in the opposed surface via a second acoustical duct, wherein the first and second acoustical ducts are configured such that acoustical signals in at least a portion of the audible range are transmitted through the first and second acoustical ducts substantially unhindered, and wherein the portion of the audible range includes acoustical signals with frequencies between approximately 300 Hz and approximately 3000 Hz.

20. The method according to claim 1, wherein the first sound port of the miniature loudspeaker housing is acoustically coupled to the first sound opening in the first surface via a first acoustical duct, and the second sound port of the miniature loudspeaker housing is acoustically coupled to the second sound opening in the opposed surface via a second acoustical duct, wherein the first and second acoustical ducts are configured such that acoustical signals in at least a portion of the audible range are transmitted through the first and second acoustical ducts substantially unhindered, and wherein the portion of the audible range includes acoustical signals with frequencies between approximately 100 Hz and approximately 10000 Hz.

* * * * *